United States Patent [19]

Frister et al.

[11] 4,363,983
[45] Dec. 14, 1982

[54] AUTOMOTIVE-TYPE VOLTAGE REGULATOR AND SUPPORT ASSEMBLY STRUCTURE

[75] Inventors: Manfred Frister, Schwieberdingen; Stefan Renner, Leonberg-Silber; Friedhelm Meyer, Illingen; Klaus H. Christ, Stuttgart, all of Fed. Rep. of Germany

[73] Assignee: Robert Bosch GmbH, Stuttgart, Fed. Rep. of Germany

[21] Appl. No.: 185,413

[22] Filed: Sep. 9, 1980

[30] Foreign Application Priority Data

Sep. 21, 1979 [DE] Fed. Rep. of Germany ....... 2938275

[51] Int. Cl.³ .......................................... H02K 11/00
[52] U.S. Cl. .................................. 310/68 R; 310/239
[58] Field of Search ................. 322/28; 310/239, 68 R

[56] References Cited
U.S. PATENT DOCUMENTS

| | | | |
|---|---|---|---|
| 3,496,394 | 2/1970 | Balcke et al. | 310/239 X |
| 3,586,892 | 6/1971 | Sato | 310/68 R |
| 3,588,617 | 6/1971 | Grozinger et al. | 322/28 X |
| 4,128,802 | 12/1978 | Gansert et al. | 322/28 |
| 4,162,414 | 7/1979 | Takabatake | 310/68 R |
| 4,197,473 | 4/1980 | Allport | 310/239 X |

Primary Examiner—R. J. Hickey
Attorney, Agent, or Firm—Frishauf, Holtz, Goodman & Woodward

[57] ABSTRACT

To facilitate assembly under mass production conditions, and to permit efficient cooling, a voltage regulator structure secured within a power transistor housing of the TO-5 shape as attached to a carrier plate which is narrower than the diameter of the housing, with a cooling sheet metal element interposed, bent over the carrier plate to be positioned within the cooling air stream of the automotive alternator, a carrier plate being preferably integral with the brush holder for the field current slip rings of the alternator. The brush holder-carrier plate combination is formed with attachment eyes on the carrier plate laterally of the voltage regulator, to attach the entire unit into an alternator and provide rugged and secure connection of the entire assembly to the remainder of the alternator structure.

8 Claims, 3 Drawing Figures

4,363,983

AUTOMOTIVE-TYPE VOLTAGE REGULATOR AND SUPPORT ASSEMBLY STRUCTURE

Reference to related Patent assigned to the assignee of the present application, the disclosure of which is hereby incorporated by reference:
U.S. Pat. No. 4,128,801 Gansert
U.S. Pat. No. 4,128,802 Gansert et al.

The present invention relates to a voltage regulator for electrical generators and most particularly to a voltage regulator and support assembly for incorporation with a-c generators adapted for attachment to an internal combustion engine, and especially of the automotive type, for use in controlling the voltage of an on-board vehicular electrical network.

BACKGROUND AND PRIOR ART

Solid state technology permits integrating an entire voltage regulator structure and network into a single housing of the power transistor type, typically a TO 5 housing. The voltage regulator controls the output voltage of the generator by cyclical connection of the field winding of the generator. The voltage regulator receives, or generates a reference voltage, for example by an internally connected Zener diode, and thus maintains the output voltage of the generator at a level suitable to supply the electrical power requirements of the on-board network and to keep a floating battery charged.

Various types of support arrangements and housing have been used to support the voltage regulator and connect it to the generator. One such housing, described in U.S. Pat. No. 4,128,802 Gansert is similar to the housing for a power transistor, including the circuit and switching elements of the voltage regulator therein. Since the output of the voltage regulator controls the current flow through the field winding of the generator which, typically is supplied over slip rings to a rotating field, it has also been proposed to combine the support and housing structure of the voltage regulator with a brush holder for the slip rings of the alternator. The respective installations and support arrangements which have been proposed, while being entirely satisfactory for many purposes, may cause difficulties in assembly, particularly under mass production conditions. In one such arrangement, the circuit elements for the voltage regulator included in the transistor-like housing is positioned in a recess of the brush holder. This arrangement is difficult to assemble and, because of its position on the brush holder, does not provide the optimum location for cooling of the voltage regulator.

THE INVENTION

It is an object to improve the voltage regulator construction so that it can be readily attached to a brush holder, or from part thereof, and still provide for adequate cooling.

Briefly, the voltage regulator and support assembly provide a regulator structure with an essentially cylindrical housing and a flat end surface, preferably formed by a flat closure plate therefor. In accordance with the invention, a carrier plate having a plan outline longer than the closure plate is provided, the regulator structure being secured to the plate with the closure plate positioned thereon. Preferably, a sheet metal element forming a cooling fin is interposed between the closure plate of the regulator structure and the carrier plate.

The carrier plate is formed with raised attachment bosses, positioned laterally of the closure plate of the regulator structure, and through bores extending through the bosses so that the bosses will form attachment eyes for connection to the alternator, or brush holder structure. The carrier plate can be formed as part of the brush holder assembly, for example made of die cast metal, if the brush holder assembly is formed with insulating sleeves, or as a single plastic injection molding, the bosses and the through-eyes permitting attachment of the entire assembly to the generator structure. The projecting sheet metal forming the cooling fin then preferably is bent over at 90° to provide an efficient cooling surface, to be cooled by air passing through the alternator due to the fan wheel customarily placed thereon, while requiring only a minimum of space.

The arrangement has the advantage that the entire assembly can easily be secured in the housing of the alternator while providing for efficient cooling the voltage regulator. The attachment arrangement by reinforcing the area around the attachment eyes in the form of raised bosses insures reliably attachment to the generator without danger of failure, and long life.

DRAWINGS

Figure 1:
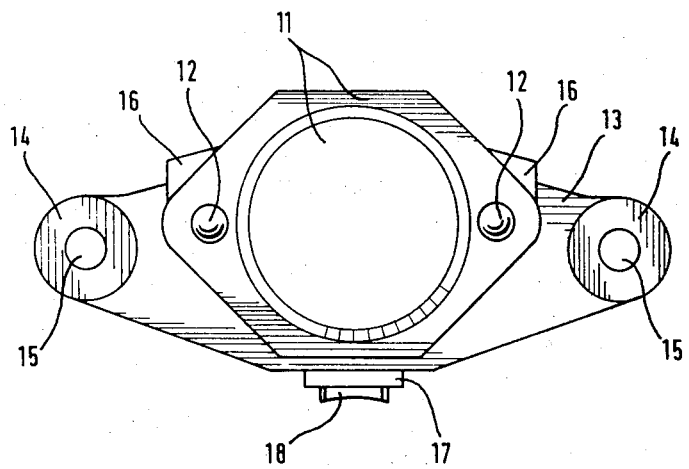
FIG. 1 is a pictorial top view of the voltage regulator housing on the support plate.
Figure 2:
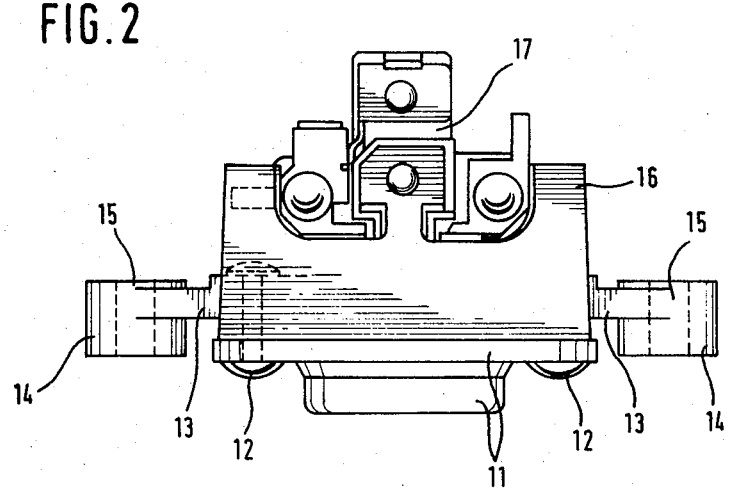
FIG. 2 is a side view of the voltage regulator combined with a brush holder of the alternator.

The voltage regulator has a housing 11 (FIG. 1) which is suitably secured to a carrier plate 13, for example by rivets 12 (FIGS. 1,2). The carrier plate 13 is generally flat, and of larger lateral extent than the housing 11 of the voltage regulator, but narrower in the central portion thereof. Eyes formed by projecting bosses 14, with through bores 15 are located laterally of the housing 12. The housing 12, itself, is terminated at the side facing the area plate 13 by a flat surface or a plate. The eyes 14 are circular-cylindrical. The bores 15 through the eyes permit attaching the voltage regulator-support plate combination 11, 13 in, or on the housing of an alternator (not shown). A sheet metal element 16 forming a cooling fin, is located between the housing of the voltage regulator and the plate 13. The cooling fin 16 extends around the back portion of the plate 13, as best seen in FIGS. 2 and 3, for a suitable distance to provide efficient cooling upon air flow in the direction of the arrow A (FIG. 3) streaming past the cooling fin which thus presents a major surface to air flow.

A brush holder 17 (FIGS. 2,3) can be integrated with the plate 13 as one unitary housing, projecting at right angles therefrom; alternatively, the brush holder 17 can be attached to the carrier plate 13 by suitable attachment rivets.

Figure 3:
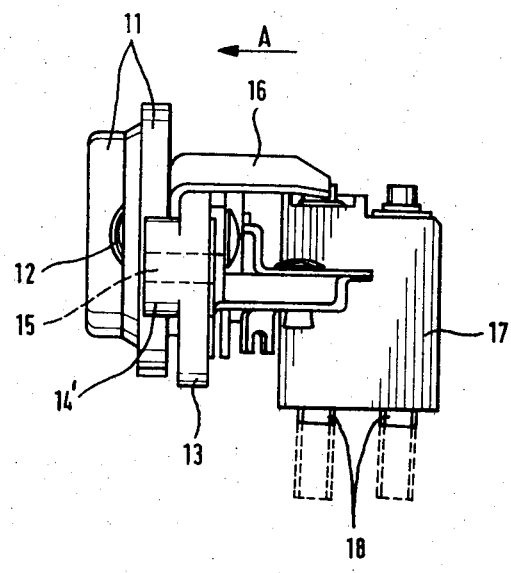
FIG. 3 is an end view, rotated 90° with respect to FIG. 2, of the voltage regulator-brush holder combination.

The bosses 14, projecting from the plate 13 can extend either in both directions from the major plane of the carrier plate 13, as best seen in FIG. 2, or from only one plane thereof, as seen in FIG. 3, where boss 14' extends only in the direction of the voltage regulator 11. For some constructions, the bosses 14 can extend in the other direction, that is, with respect to FIG. 3, plate 13 would be reversed.

The shape of the cooling plate 16 is best seen in FIG. 3 which shows the plate 16 being bent at right angles about the support plate 13. Brushes 18 are alidably positioned in the brush holder 17, to apply current to slip rings (not shown) of the alternator, in accordance with standard construction.

We claim:

1. Voltage regulator and support assembly comprising a regulator structure (11) having an essentially cylindrical housing defining a flat end surface;

a carrier plate (13) having a plan outline in one direction which is larger than the surface of the regulator structure and narrower than the diameter of the cylindrical housing, the regulator structure being secured to said plate with the flat end surface positioned parallel thereto;

raised attachment bosses (14) formed on the carrier plate laterally of the surface of the regulator structure, and through-bores (15) extending through said bosses, whereby the bosses will form reinforced attachment eyes for the carrier plate and the voltage regulator structure secured thereto, while leaving part of said surface exposed to cooling air.

2. Assembly according to claim 1 further including a sheet metal cooling fin (16) positioned between said flat surface of the regulator structure and the carrier plate to provide a heat sink and extended cooling surface.

3. Assembly according to claim 2, wherein the cooling plate (16) is bent over and around said carrier plate (13) to form an extended portion exposed to cooling air flow, the direction of the bend being away from the cylindrical housing of the regulator structure.

4. Assembly according to claims 1 or 2 or 3 further including a brush holder assembly (17), the carrier plate (13) being integrally formed together with said brush holder assembly.

5. Assembly according to claim 1, wherein the bosses (14') project only from one side of the major plane of the carrier plate (13).

6. Assembly according to claim 5, wherein the bosses project from the side of the carrier plate at which said voltage regulator structure (11) is placed.

7. Assembly according to claim 1, wherein the bosses (14) project from both sides of the carrier plate (13).

8. Assembly according to claim 1, wherein the bosses (14) are circular-cylindrical, and the through bores (15) are circular holes, to form said eyelets in circular-cylindrical form.

* * * * *